(12) United States Patent
Tangpirounthum et al.

(10) Patent No.: US 11,399,583 B2
(45) Date of Patent: Aug. 2, 2022

(54) GLOVE AND A METHOD FOR PRODUCING THE SAME

(71) Applicants: Niphan Tangpirounthum, Bangkok (TH); Eak Tangpirounthum, Bangkok (TH)

(72) Inventors: Niphan Tangpirounthum, Bangkok (TH); Eak Tangpirounthum, Bangkok (TH)

( * ) Notice: Subject to any disclaimer, the term of this patent is extended or adjusted under 35 U.S.C. 154(b) by 346 days.

(21) Appl. No.: 16/502,233

(22) Filed: Jul. 3, 2019

(65) Prior Publication Data
US 2021/0000203 A1 Jan. 7, 2021

(51) Int. Cl.
| | | |
|---|---|---|
| A41D 19/01 | (2006.01) | |
| A41D 19/015 | (2006.01) | |
| A41D 19/00 | (2006.01) | |
| B29D 99/00 | (2010.01) | |

(52) U.S. Cl.
CPC ..... *A41D 19/01547* (2013.01); *A41D 19/001* (2013.01); *A41D 19/0006* (2013.01); *A41D 19/0044* (2013.01); *B29D 99/0067* (2013.01)

(58) Field of Classification Search
CPC ............ A41D 19/01547; A41D 19/001; A41D 19/0006; A41D 19/0044; B29D 99/0067
See application file for complete search history.

(56) References Cited

U.S. PATENT DOCUMENTS

| | | | | |
|---|---|---|---|---|
| 4,755,158 A | * | 7/1988 | Wise | A63B 31/04 156/279 |
| 4,847,918 A | * | 7/1989 | Sturm | A41D 19/001 2/161.6 |
| 6,941,580 B2 | * | 9/2005 | Kolcio | A41D 19/0065 2/161.6 |
| 2006/0150300 A1 | * | 7/2006 | Hassan | A41D 19/0058 2/161.6 |
| 2007/0083980 A1 | * | 4/2007 | Yang | A41D 19/0068 2/167 |
| 2007/0124849 A1 | * | 6/2007 | Williams | B32B 27/322 2/275 |
| 2010/0257656 A1 | * | 10/2010 | Hull | A41D 19/0003 2/161.8 |
| 2010/0275342 A1 | * | 11/2010 | Sweeney | D04B 1/126 2/167 |
| 2012/0036612 A1 | * | 2/2012 | Hull | A41D 19/0058 2/163 |
| 2012/0159681 A1 | * | 6/2012 | Gibby | A41F 1/06 2/20 |

(Continued)

*Primary Examiner* — Khaled Annis
(74) *Attorney, Agent, or Firm* — Kim IP Law Group LLC

(57) ABSTRACT

The present disclosure relates to a glove with both flock-lined and unlined interior surfaces The glove generally comprises a hand region including a palm portion and a dorsal portion; a thumb region and four individual digit regions projecting away from one end of the hand region; and a cuff region extending outwardly from another end of the hand region opposing to the thumb region and the four individual digit regions. The cuff region terminates to a terminal end defining an opening for insertion of a user hand therein. Preferably, the hand region comprises flock lining on at least the interior surface of the palm portion or one or more selected areas on the interior surface of the palm portion. The cuff region is free from having any flock lining.

10 Claims, 8 Drawing Sheets

(56) References Cited

U.S. PATENT DOCUMENTS

| | | | |
|---|---|---|---|
| 2014/0059739 A1* | 3/2014 | Gellis | A41D 19/01547 2/168 |
| 2014/0137307 A1* | 5/2014 | Borreau | A41D 31/102 2/69 |
| 2014/0290312 A1* | 10/2014 | Atwood | A41D 19/001 66/174 |
| 2015/0128324 A1* | 5/2015 | Baker | A41D 19/04 2/20 |
| 2015/0135403 A1* | 5/2015 | Mercado | A41D 19/001 2/164 |
| 2015/0143608 A1* | 5/2015 | Loo | B29D 99/0067 2/161.6 |
| 2015/0143610 A1* | 5/2015 | Pimentel de Oliveira | A41D 19/01547 2/167 |
| 2015/0272245 A1* | 10/2015 | Khor | B29C 41/46 2/21 |
| 2015/0374052 A1* | 12/2015 | Pimentel de Oliveira | A41D 19/01558 2/161.6 |
| 2016/0050993 A1* | 2/2016 | Sood | A41D 19/01558 2/161.8 |
| 2017/0000202 A1* | 1/2017 | Hassan | C09D 123/06 |
| 2017/0055607 A1* | 3/2017 | Francisco Costa | A41D 19/0062 |
| 2017/0142931 A1* | 5/2017 | Michaelson | B29C 45/1701 |
| 2017/0348065 A1* | 12/2017 | Bluecher | A41D 31/12 |
| 2018/0296058 A1* | 10/2018 | Firouzman | A47L 13/18 |
| 2019/0059478 A1* | 2/2019 | Walker | A41D 19/001 |
| 2019/0239585 A1* | 8/2019 | Chou | C09D 179/02 |
| 2019/0343200 A1* | 11/2019 | Cai | A41D 19/02 |

\* cited by examiner

GLOVE AND A METHOD FOR PRODUCING THE SAME

TECHNICAL FIELD

The present disclosure relates to a glove with selected portions or areas of the interior surface(s) thereof being flock-lined or impregnated with a coating to facilitate donning of the glove. More specifically, the glove features both lined and unlined interior surfaces therein to deliver an intended experience for the glove wearer. Additionally, the present disclosure also relates a method of manufacturing such a glove.

BACKGROUND

Articles such as ambidextrous gloves are commonly used as a protective barrier against direct surface-to-surface communication or contamination between the hands of the user or wearers and objects being handled. As such, ambidextrous gloves are manufactured in such a way that they are entirely impermeable to contaminants or microorganisms during use. Ambidextrous gloves are typically thin and manufactured using soft elastomeric materials such as natural or synthetic rubbers. Owing to air and water impermeability, repeated donning and prolonged wearing of tight-fitting elastomeric gloves, e.g., as specified by work requirements, such as those implemented in the food processing industry and medical fields, can be an unpleasant experience. The typical or most common discomfort encountered by the user when wearing gloves, e.g., ambidextrous hand gloves, for a prolonged period of time is associated with the retention of hand humidity, moisture, or sweat inside the glove. Not only does the user have to endure the discomfort of their sweaty hand wrapped inside the glove, e.g., throughout their working period, some users with skin sensitivities may further suffer from undesired or unpleasant reactions such as development of skin rashes, despite the hypoallergenic nature of some gloves, e.g., certain conventional ambidextrous gloves. Elastomeric gloves, especially those manufactured using natural latex, are generally tacky as a result of the high friction coefficient of the opposing interior surfaces within the glove. The high friction coefficient elevates the adhesion between the two opposing interior surfaces actively working against insertion of the user's hand into the glove, which is a common phenomenon known as blocking. The difficulty of donning such a glove becomes greater when the skin of the user is damp or wet, which frequently occurs when the wearer cleans their hands prior to the glove donning by scrubbing and washing, and, as often is the case, performs only a fast yet incomplete hand drying. The partially dried hand will encounter greater resistance against its introduction into the glove as a result of undue clinging or friction between the surface of the glove and the damped skin of the wearer. Attempts to push the hand in by force may sometimes tear or break the glove. Worse yet, the tearing or breakage of the glove can be so minor that it might go unnoticed, subjecting the wearer to unwanted risk of contamination.

The drawbacks mentioned above warrants the need for gloves that provide enhanced ease of donning, and greater comfort during use, including prolonged use.

SUMMARY

In accordance with the present disclosure, a hand glove, e.g., an ambidextrous hand glove, is formed of at least one type of elastic polymer suitable for wearing, e.g., prolonged wearing, with minimal discomfort. The hand glove serves as a physical barrier that prevents direct contact (e.g., unwanted or undesirable contact) between the user's hand and objects, surfaces, and/or substances that can directly contact the exterior surface(s) of the glove. For instance, the glove can protect the user's hand against water, chemicals, oils, solvents, or other substances where physical contact (e.g., prolonged physical contact) may be harmful to the user's hand.

Particular portions or areas of the glove's interior surface(s) that are intended to contact the hand of the user or wearer, i.e., particular inner or internal portions of the glove, are covered with flock lining, which allows better sweat absorption of the glove when in contact with their hand, and enhanced ease of glove donning.

The presence of the flock lining on interior surfaces of the glove that contact the hand of the user can reduce the likelihood of skin irritation, e.g., caused by perspiration, particularly at the palm region after donning the glove, for extended glove wearing periods.

In various embodiments, the present disclosure provides an ambidextrous flock-lined household glove, which is economical and comfortable for the user.

However, it was discovered by the inventors named on the present application that donning fully flock-lined ambidextrous gloves is difficult due to their narrow and inelastic (after being flock-lined) cuff region. Various gloves in accordance with the present disclosure carry flock lining on particular interior surfaces or regions thereof, which reduces donning difficulty even when the hands of the user are damp or wet compared to a conventional flock-lined glove. More particularly, in accordance with the present disclosure, flock material is provided only on selected areas inside the glove where sweat absorption is necessary, but is excluded or omitted at other locations inside the glove to favor ease of donning. Still more particularly, a glove in accordance with the present disclosure has at least the cuff or wrist region of the glove free or substantially free from flock lining. In various embodiments the cuff or wrist region excludes flock lining. Furthermore, the cuff region may be impregnated with an anti-block coating, donning coating, or acrylic coating to facilitate insertion of the hands therein in the absence of the flock lining. Alternatively, the glove may have the cuff or wrist region chlorinated to favor ease of donning.

A glove in accordance with the present disclosure can further have predetermined exterior or external surface areas fabricated, e.g., by way of textured patterns, to provide enhanced gripping or holding ability, force, or power for grasping or retaining an object by the user's hand after the glove is donned. Such enhanced gripping/holding areas are deliberately or intentionally prepared on predetermined areas or regions of the external surface(s) of the glove, and are deliberately or intentionally omitted or excluded from other portions of the glove's external surface(s) in order to minimize unwanted or unnecessary friction caused by movements of portions of the glove against glove-covered portions of the user's hand, such as finger movements. The glove's enhanced gripping/holding ability is thus provided without sacrificing the agility or smoothness of the user's finger movements.

In accordance with a first aspect of the present disclosure, a hand glove or glove includes one or more inner, internal, interior surfaces, e.g., a set of inner, internal, or interior surfaces, that are intended to face or which face inwardly toward the user's hand after the glove is donned. The glove further includes one or more outer, external, or exterior surfaces, e.g., a set of outer, external, or exterior surfaces, that are intended to face or which face outwardly away from the user's hand after the glove is donned. The glove provides a hand region including a palm portion and a dorsal portion behind or opposite the palm portion; a thumb region and four individual digit regions projecting away, e.g., in distal directions, from one end of the hand region, wherein a closest of the four individual digit regions to the thumb region is an index finger region, adjacent to which is a middle finger region, adjacent to which is a ring finger region, adjacent to which is a pinky finger region; and a cuff region extending away, e.g., in proximal directions, from another end of the hand region opposite to or opposing the thumb region and the four individual digit regions. The cuff region has a terminal end defining an aperture or opening for insertion of a user's hand therein. In various embodiments, the hand region includes flock lining on one or more selected areas of the interior surface(s) of the glove corresponding to the palm portion, e.g., substantially the entire interior surface of the palm portion; and the glove's cuff region is free of having any flock lining on its interior surface(s).

In multiple embodiments, the glove includes flock lining on the interior surface(s) of the entirety of the hand region. In such embodiments, a pair of gloves can adopt the form of ambidextrous gloves where each glove can be donned by either the right or left hand of the user, as long the thumb region and/or index finger region is correctly aligned relative to the user's hand during glove donning.

In some embodiments, the glove can have flock lining on the interior surface(s) of the thumb region and the interior surface(s) of at least some of the four individual digit regions to further improve glove comfort or usability, e.g., during prolonged glove wearing.

In several embodiments, the interior surface(s) of the cuff and/or wrist region can be at least partially integrated with an anti-block coating, donning coating, or acrylic coating. Additionally or alternatively, particular surface(s) of the cuff and/or wrist region, e.g., interior surfaces thereof, can be treated, for instance, by way of halogenation/chlorination, e.g., involving a chlorination process (e.g., a conventional chlorination process), to reduce stickiness. Thus, the interior surface(s) of the cuff/wrist region of the glove can be coated with an anti-block coating, donning coating, or acrylic coating, and/or halogenated or chlorinated, e.g., such as by way of a chlorination process, to facilitate glove donning.

To enhance the user's ability to grip/hold objects when the gloves are worn, in various embodiments one or more types of textured patterns can be carried or fabricated on the exterior surface(s) of the hand region and the four individual digit regions, with the lateral or left and right exterior sides of the four individual digit regions other than the index finger region free of or excluding the textured pattern(s). That is, the lateral exterior sides of each of the middle finger region, the ring finger region, and the pinky finger region exclude or omit such textured pattern(s). Also, in some (though not necessarily all) embodiments, the lateral exterior side of the index finger region that faces or which is directly adjacent to the lateral exterior side of the middle finger region is free of textured pattern(s). Such absence, lack, or omission of the textured pattern(s) at particular discrete areas or segments on the exterior surface(s) of the glove facilitates or ensures that the movement or agility of the user's fingers is not significantly degraded or jeopardized during the user's manipulation of an object due to unnecessary friction created by the textured pattern(s) carried by other portions or areas of the glove's exterior surface(s). In certain embodiments, one or more portions of the index finger region along the index finger's length, e.g., below the tip of the index finger region, are completely encircled by one or more textured patterns. In specific embodiments, the index finger region carries along at least a portion of its length, e.g., below a tip portion or tip thereof, on one of its lateral sides that faces an adjacent individual digit region, e.g., the lateral exterior side that faces or which is directly adjacent to the lateral exterior side of the middle finger region, at least one different textured pattern than that carried by one or more other exterior portions, e.g., an opposite or opposing lateral side, of the index finger region, e.g., below the tip portion or tip thereof.

In several embodiments, the glove can aid, reinforce, or further enhance the user's gripping/holding force or ability by way of structures such as textured patterns carried by predetermined exterior portions of the thumb region and index finger region, e.g., which correspond or are expected to correspond to specific portions of the user's thumb and index finger, respectively, when the glove is donned. More specifically, the thumb region and can have its exterior surface fabricated with a set of textured patterns around an area corresponding to the joint of the distal phalanges and the proximal phalanges of the thumb of the user, forming an enhanced gripping section. The enhanced gripping section stretches towards the tip of the thumb region covering an area corresponding to substantially ½ to ⅔ of the distal phalanges of the thumb of the user. In some embodiments, the enhanced gripping section of the thumb region is free from merging or joining into the textured pattern fabricated on the hand region. The index finger region can have its exterior surface fabricated with a set of textured patterns around areas corresponding to its distal, middle, and proximal phalanges, to provide an enhanced gripping section, including in some (though not necessarily all) embodiments along or about lateral index finger portions of the glove that face thumb portions of the glove. In several embodiments, for the index finger region its enhanced gripping section stretches along nearly the entire, essentially the entire, or the entire length of the index finger region, and can merge or join into the textured pattern on the hand region.

Further to the foregoing, a glove in accordance with several embodiments of the present disclosure provides one or more textured patterns on particular portions of the index finger region and/or the thumb region at which most physical contact between the user's index finger and thumb with objects would be expected to occur in the absence of the glove. The deliberate employment of textured pattern(s) at these locations of the glove facilitates better grip when the user is grasping or carrying an object.

In some embodiments, the exterior surface of the hand region has an area proximate or adjacent to the cuff region, e.g., directly distal or forward of the cuff region, free of textured pattern(s).

In several embodiments, the elastic polymer includes any one or a combination of natural latex, nitrile latex, styrene-butadiene, isoprene, chloroprene, isobutylene, and neoprene. Specifically, a mixture (e.g., of one or more monomers) mainly selected from the group of natural latex, nitrile latex, styrene-butadiene, isoprene, chloroprene, isobutylene, and neoprene optionally blended with one or more additives can be used to produce the elastic polymer forming the body of the glove including the hand region, the cuff region, the thumb region, and the four individual digit regions.

In accordance with a second aspect of the present disclosure, a hand glove or glove includes one or more inner, internal, interior surfaces, e.g., a set of inner, internal, or interior surfaces, that are intended to face or which face inwardly toward the user's hand after the glove is donned. The glove further includes one or more outer, external, or exterior surfaces, e.g., a set of outer, external, or exterior surfaces, that are intended to face or which face outwardly away from the user's hand after the glove is donned. The glove provides a hand region including a palm portion and a dorsal portion behind or opposite the palm portion; a thumb region and four individual digit regions projecting away, e.g., in distal directions, from one end of the hand region, wherein a closest of the four individual digit regions to the thumb region is an index finger region, adjacent to which is a middle finger region, adjacent to which is a ring finger region, adjacent to which is a pinky finger region; and a cuff region extending away, e.g., in proximal directions, from another end of the hand region opposite to or opposing the thumb region and the four individual digit regions. The cuff region has a terminal end defining an aperture or opening for insertion of a user's hand therein. The thumb region and the four individual digit regions include flock lining on the interior surfaces thereof. The cuff region is chlorinated or carries or is integrated with an anti-block coating, donning coating, or acrylic coating.

Such a glove can include one or more types of textured patterns fabricated on the exterior surface(s) of the hand region and the four individual digit regions, with the lateral exterior sides of the individual digit regions other than the index finger region free of the textured pattern(s). Further, the lateral exterior side of the index finger region that faces or which is adjacent to the lateral exterior side of the middle finger region is free of textured pattern in accordance with several embodiments.

Such a glove can have the exterior surface of the thumb region fabricated with the textured pattern(s) around an area corresponding to the distal phalanges and the proximal phalanges of the thumb of the user, forming an enhanced gripping section. The enhanced gripping section can extend distally towards the tip of the thumb region, covering an area corresponding to approximately ½ to ⅔ of the distal phalanges of the user's thumb.

In accordance with another aspect of the present disclosure, a process for producing or manufacturing a hand glove, e.g., an ambidextrous hand glove that selectively provides flock lining and which selectively provides textured patterns as set forth herein, includes: forming a set of coated areas (i.e., one or more coated areas) by way of applying a coating on a first coagulated latex layer shaped on a former, where the coating can include or be any one or combination of an anti-block coating, a donning coating, or an acrylic coating; forming a second latex layer on the first coagulated latex layer; creating flock lining on one or more areas on the surface of the formed second latex layer to produce a molded glove, wherein the created flock lining is free from overlaying on the coated areas; drying and leaching the molded glove; and stripping the molded glove off the former to obtain the hand glove. The hand glove can be structurally defined or generally structurally defined as set forth above.

The set of coated areas includes or is a coated area located at the cuff region of the hand glove, and the coating facilitates insertion of the user's hand therein.

In a number of embodiments, the process further includes water leaching after forming the coated areas and/or forming the second latex layer.

DETAILED DESCRIPTION

Figure 1:
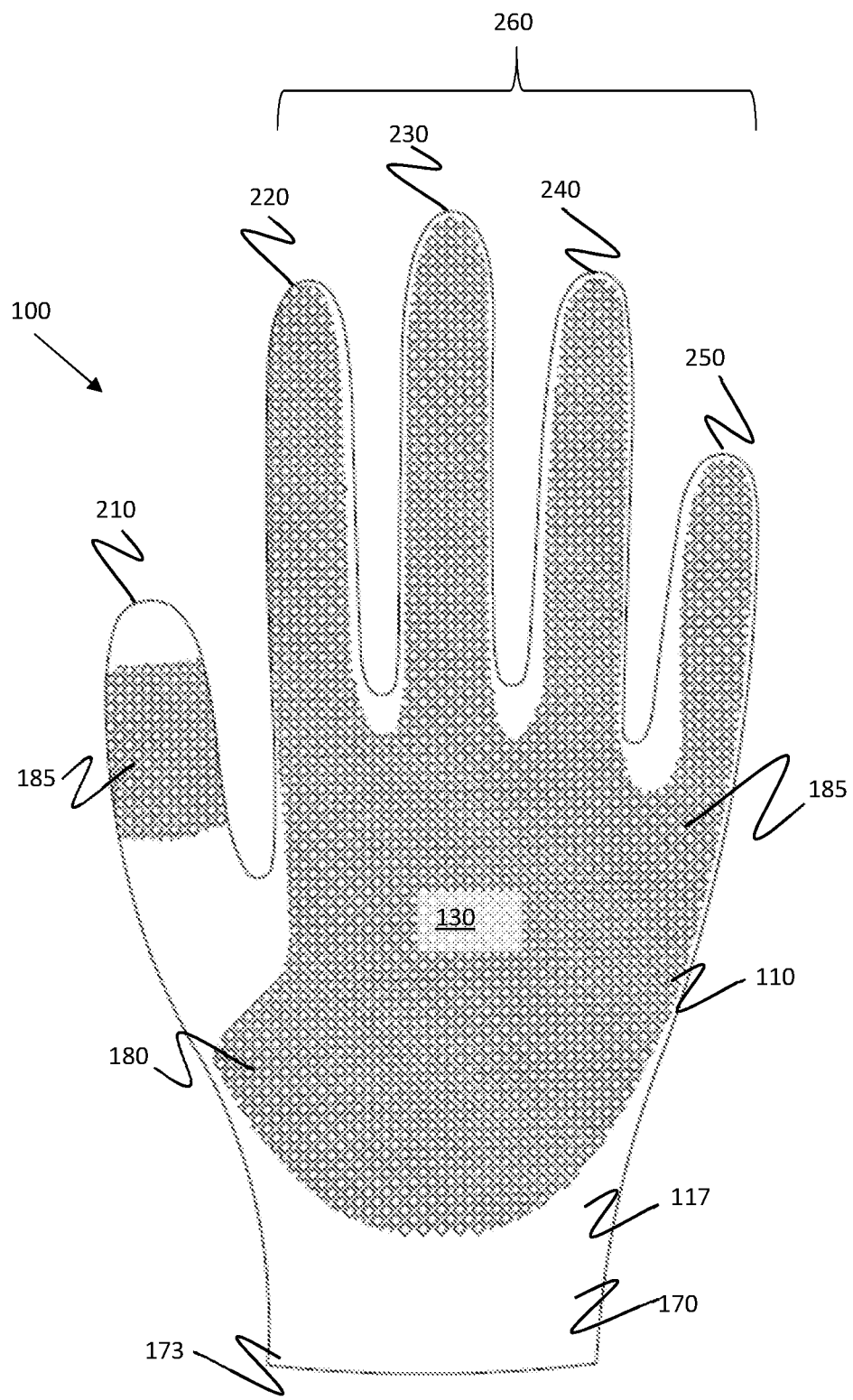
FIG. 1 shows a front view of one embodiment of an ambidextrous glove in accordance with an embodiment of the present disclosure.

The detailed description set forth below in association with the appended drawings is intended as a description of particular non-limiting representative embodiments of a hand glove or glove in accordance with the present disclosure, and is not intended to represent the only forms in which embodiments in accordance with the present disclosure can be constructed or utilized. The description and associated flowchart also sets forth a particular non-limiting representative process for manufacturing or fabricating a glove in accordance with an embodiment of the present disclosure. It is to be understood that different or other embodiments are also encompassed within the scope of the present disclosure, which provide the same, equivalent, or similar structural and/or functional features as those described herein. As used herein, the phrase "in embodiments" means in some embodiments but not necessarily in all embodiments. As denoted elsewhere herein, like element numbers are intended to be indicate like or similar elements, structures, or features.

The term "interior surface" in this specification refers to the inner or internal surface or surfaces of the glove which is or are intended to face or contact the skin of a wearer or user of the glove. Likewise, the term "exterior surface" in this specification refers to the external surface or surfaces of the glove which is or are intended to be exposed to the user's surrounding environment when the glove is worn, and can or will likely touch one or more objects or substances in accordance with positioning or movement of the user's hand when the glove is worn. The glove's exterior surface faces outwardly away from the glove's interior surface when the glove is worn.

The directional term "distal" as used herein refers to directions toward the ends or tips of the user's thumb or fingers when the glove is worn; and the term "proximal" as used herein refers to directions toward the user's wrist or forearm when the glove is worn.

The term "lateral" refers to left and/or right sides of the glove and thus the user's body when the glove is worn. Other directional terms such as "top", "bottom", "lateral", "parallel", "side", "perpendicular", "distal" and "proximal" may used herein, and generally refer to relative spatial direction(s) with regard to the position of the user wearing or using the described glove.

As used herein, the terms "approximately" or "about", in the context of concentrations of components, conditions, other measurement values, etc., means +/−5% of the stated value, or +/−4% of the stated value, or +/−3% of the stated value, or +/−2% of the stated value, or +/−1% of the stated value, or +/−0.5% of the stated value, or +/−0% of the stated value.

Referring to FIGS. 1-8, a glove 100 in accordance with particular non-limiting representative embodiments of the present disclosure is illustrated. The glove has a main body that includes or is formed of an elastic polymer. In general, the glove 100 includes a hand region 110 or center region having a palm portion 130 and a dorsal portion 150 opposite to the palm portion 130. The palm portion 130 and the dorsal portion 150 respectively overlay the palm and the back (opisthenar) area of the hand. A thumb region 210 and four individual digit regions 260 project away from one end or side of the hand region 110. More specifically, the thumb region 210 and the four individual digit regions 210 project distally away from portions of the hand region 110 corresponding to the user's thumb and four individual digits, respectively.

The four individual digit regions 260 are arranged consecutively one after another, where the individual digit region next to the thumb region 210 is an index finger region 220, subsequently or successively followed by a middle finger region 230, a ring finger region 240, and a little finger region 250. The thumb region 210, the index finger region 220, the middle finger region 230, the ring finger region 240 and the little finger region 250 will respectively be wrapped around the thumb, index finger, the middle finger, the ring finger and the little finger of the user once the glove 100 has been put on or donned.

To further secure and extend the protection that the glove 100 provides to the user, a cuff region 170 extends proximally from another end of the hand region 110 opposing or opposite to the thumb region 210 and the four individual digit regions 260. The cuff region 170 serves to cover the wrist and terminal end portion(s) of the user's lower arm when the glove 100 is donned. The cuff region 170 has a terminal end 173 defining an aperture or opening 175 for insertion of the user's hand therein. Typically, the opening 175 at the cuff region 170 can be flexibly stretched to accommodate the user's hand. Stretchability can be facilitated or enhanced through selective application of chemical coatings or a lining, as further described below.

The main body of the glove 100 can be defined to include the hand region 110, the cuff region 170, the thumb region 210 and the four individual digit regions 260.

In various embodiments, the elastic polymer forming the main body of the glove 100 includes any one or a combination of natural latex, styrene-butadiene, isoprene, chloroprene, and isobutylene. Specifically, a mixture of monomer mainly selected from the group of natural latex, styrene-butadiene, isoprene, chloroprene, isobutylene and any combination thereof, together with one or more additives, can be used to produce the elastic polymer composing the main body of the glove 100.

As set forth herein description, the glove 100 can deliver an improved wearing experience to the user, particularly with respect to donning the glove 100 and extended glove wearing.

To alleviate the aforesaid problems relating to humidity, moisture, or sweat entrapped within the glove 100, the hand region 110 of the glove 100 carries flock lining or a flock-lined surface 280 on one or more selected areas of the interior of the palm portion 130, or significant areas of the interior of the palm portion 130 (e.g., at least 70-80% of the palm portion's interior surface), or the entire or essentially the entire interior surface of the palm portion 130, as the palm of the hand is expected to perspire more than other parts of the hand. With the flock lining 280 established at least on portions of the interior surface of the palm portion 130, the glove 100 can reduce or greatly reduce the uncomfortable sensation that the user can experience as a result of humidity, moisture, or sweat entrapped inside the donned glove, even after the glove 100 has been worn for an extended period of time. More specifically, the flock lining or flock-lined surface 280 can at least partly absorb the humidity, moisture, or sweat retained, thus greatly improving the comfort and sweat absorbability of the glove 100, improving or enhancing the user's glove wearing experience. In various embodiments, the flock lining or flock-lined surface 280 can include a material such as cotton, rayon, nylon, and/or any combination thereof.

Figure 8:
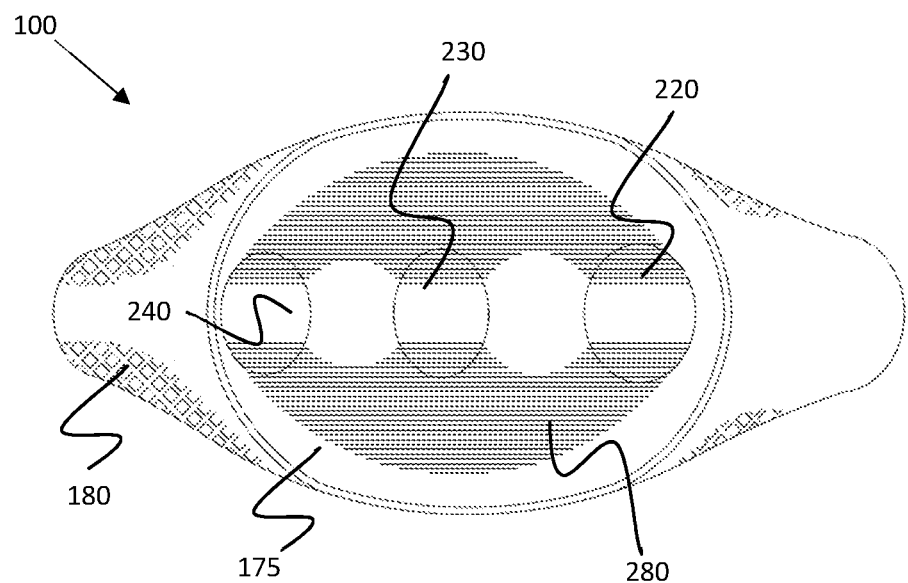
FIG. 8 illustrates a bottom view of the ambidextrous glove shown in FIG. 1.

According to several embodiments, the glove 100 can include or provide flock lining or a flock-lined surface 280 on the interior surface of the entirety, essentially the entirety, or nearly the entirety of the hand region 110. In such embodiments, the glove 100 is usable as ambidextrous glove 100 capable of being worn by either the right or left hand of the user, while sweat absorbability of the glove 100 becomes enhanced corresponding to the increased coverage of the flock lining or flock-lined surface 280. In some embodiments, the glove 100 further includes or provides flock lining 280 on at least portions of the interior surfaces of the thumb region 210 and four individual digit regions 260. A representative example of such an embodiment is illustrated in FIG. 8. For instance, the entire interior surface of the glove 100 in such an embodiment can be fully provided or embedded with flock lining 280, except the cuff region 170.

Notwithstanding the foregoing, the inventors named on the present application further discovered that the region or area of the glove 100 that carries or is overlaid with flock lining 280 tends to have decreased pliability or stretchiness, resulting substantial difficulty in putting on the glove 100, especially when the user's hand is damp/moist or wet. For mitigating this issue, the glove 110 can further have at least portions of the cuff region 170 integrated with an anti-block coating, a donning coating and/or an acrylic coating to improve the donning experience. For instance, the anti-block additive or coating can include or be any one or any combination of cross-linked cornstarch, methacrylate polymer, and hydrogel of copolymer of hydroxy ethyl acrylate (HEA) and hydroxy ethyl methacrylate (HEMA) as well as acrylic acid. The anti-block additive or coating generally forms microscopic protrusions on the interior surface of the cuff region 170, and these protrusions help to reduce or minimize adhesion of the two opposing interior surfaces of the glove 100 around the cuff region 170 by way of creating distance or space between these two opposing interior surfaces, thereby lessening the blocking and facilitation insertion of the user's hand into the glove 100. Without the anti-block additive or coating, the blocking between the two opposing interior surfaces results in greater friction that resists insertion of the user's hand into the glove 100.

Further, one or more donning additives or coatings can be disposed on the interior surface of the glove 100 that is free of the flock lining 280, e.g., interior portions of the glove 100 that lack or exclude the flock lining 280. A donning additive or coating can include or be selected from cross-linked cornstarch, methacrylate polymer, hydrogel of copolymer of hydroxy ethyl acrylate (HEA) and hydroxy ethyl methacrylate (HEMA) as well as acrylic acid, or any combination derived thereof. Such additives or coatings can be applied to smooth areas of the glove's the interior surface, especially around the cuff region 170 where the user begins to push their hands into the glove 100. In some embodiments, the entire interior surface of the cuff region 170 is completely coated or impregnated with the aforesaid additive(s) or coating(s), whereas in certain embodiments, the additive(s) or coating(s) can be applied only to selected segments or areas of the interior surface of the cuff region 170. For instance, the additive(s) or coating(s) can be applied only across a predetermined distal to proximal distance around the opening 175 at the terminal end 173 of the cuff region 170. In addition to the foregoing, at least portions of the interior surface of the glove 100 can be treated by way of one or more chlorination processes (e.g., a set of conventional chlorination processes) to reduce or remove stickiness from the glove's interior surface, especially at the cuff region 170.

The inventors named on the present application found that glove wearers mainly use their index finger and thumb to hold or manipulate small objects; and wearers tend to rely on the planar exterior surface of the palm and the rest of the fingers for holding and/or manipulating relatively large objects. Therefore, in various embodiments the exterior surface of the glove 100 at these important object holding/manipulating areas carry or are incorporated with structural features that provide the glove 100 with enhanced or increased gripping, holding, or grasping power. Such structural features of the glove 100 that provide enhanced gripping power can be formed to increase the available exterior surface area of portions of the glove 100 that are primarily used for holding/manipulating objects.

Further to the foregoing, in several embodiments predetermined areas of the glove 100 carry or are fabricated with at least one type of textured pattern 180, which increases the available exterior surface area of the glove 100 in those areas. As a representative example, the glove 100 can include a textured pattern 180 fabricated on portions of the exterior surface of the hand region 110 and the four individual digit regions 260 in the manner shown in FIGS. 1-2. The palm region 130 and the dorsal region 150 can also carry the textured pattern 180, such that the glove 100 is suitable for use as ambidextrous glove.

The textured pattern 180 can include or be formed as one or more types of geometric structures or shapes repeatedly or repetitively present on one or more predetermined areas of the glove's exterior surface, such as by way of embossments and/or indentations. The geometric structures or shapes can include a combination of embossments and indentations formed on the predetermined area(s) to increase the available glove surface area contactable with a held object. For instance, in an embodiment the textured pattern 180 includes or is composed of repetitive rectangular (e.g., square) embossments formed on particular exterior areas of the glove 100, with each embossment being separated by an indented groove around its periphery, such that the arrangement of the repetitive embossments and indented grooves yields increased exterior surface area on those portions of the glove's exterior that carry the textured pattern 180. Depending upon embodiment details, one or more textured patterns 180 can exhibit other types of geometric shapes or profiles, such as by way of embossment of diamond, fish scale, honeycomb, cross, wave, fan, and/or other shapes in accordance with an intended arrangement thereof. Individuals having ordinary skill in the relevant art will understand that one or more textured patterns 180, or portions thereof, can exhibit essentially any type of geometric shape or profile, and a glove in accordance with embodiments of the present disclosure is not limited to providing textured patterns 180 having only one or more of the representative types of geometric shapes or profiles indicated above.

Figure 5:
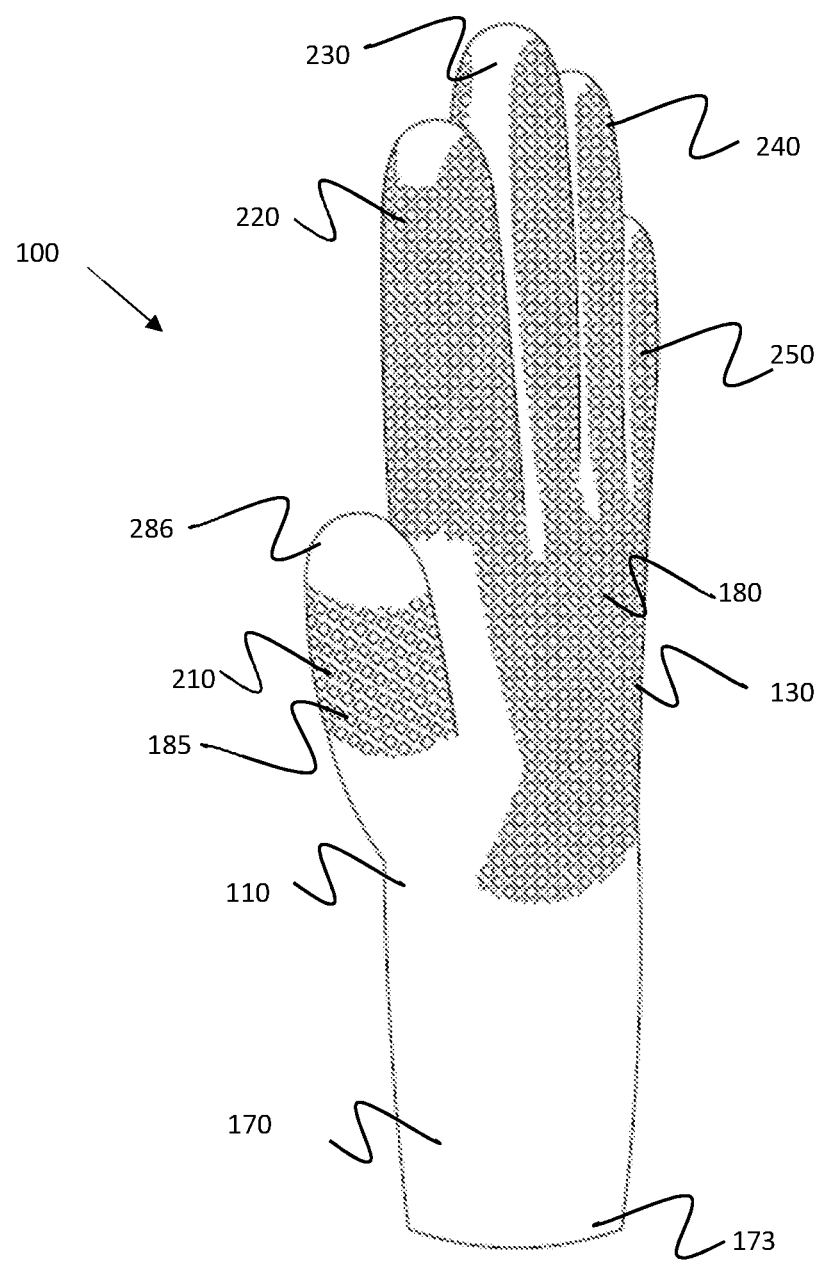
FIG. 5 is a perspective view of the ambidextrous glove of FIG. 1.
Figure 6:
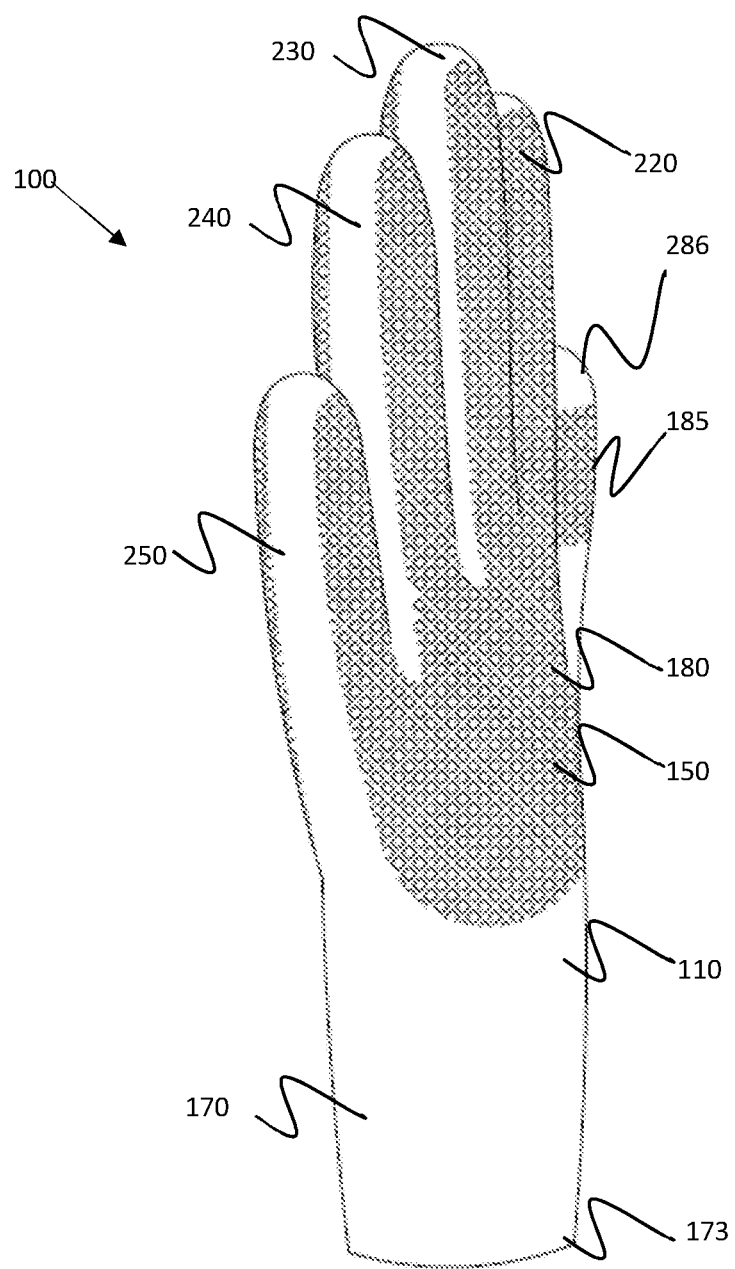
FIG. 6 is a perspective view of the ambidextrous glove of FIG. 1.
Figure 7:
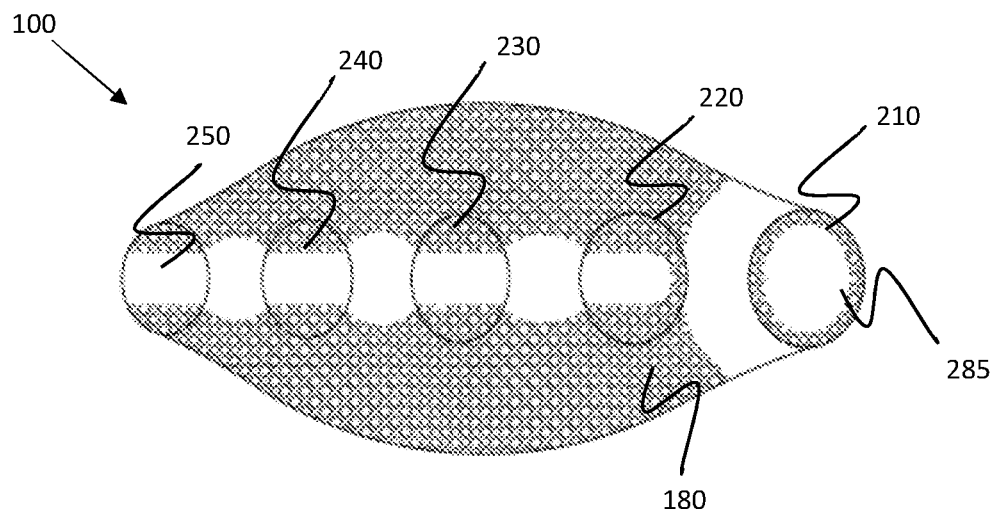
FIG. 7 illustrates a top view of the ambidextrous glove of FIG. 1.

Although increased exterior glove surface area for object gripping is desirable, the presence of the textured pattern 180 at certain locations on the exterior surface of the glove 100 can, in fact, hamper the capability of the user to effectively manipulate or maneuver a held object. For example, the presence of the textured pattern 180 on the lateral sides of the digit regions 260 can lead to elevated friction during movement of two adjacent fingers, thus restricting agility of the fingers. Moreover, having these areas of the glove 100 subjected to undesirably increased friction during finger movements can lower the service life of the glove 100. In view of such considerations, in various embodiments the lateral sides of the individual digit regions 260, other than the index finger region 220, intentionally exclude, omit, or are free of the textured pattern 180, as shown in FIGS. 1 and 5.

Figure 2:
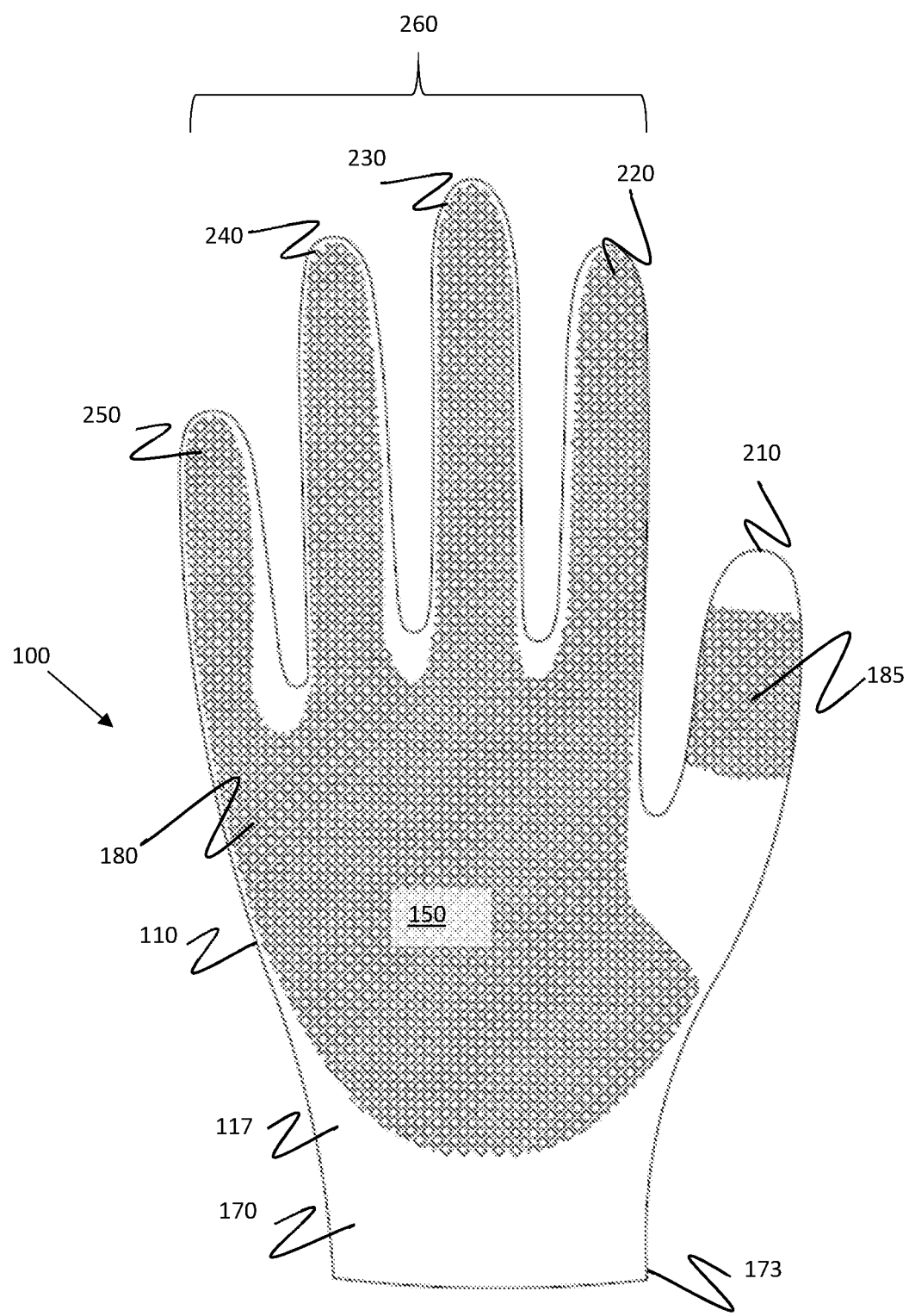
FIG. 2 shows a back view of an embodiment of the ambidextrous glove of FIG. 1.

As mentioned above, users are likely to hold and/or maneuver an object (e.g., a small object) using mainly their thumb and index finger. Consequently, in various embodiments the glove 110 provides or retains the textured pattern 180 particularly at these areas, while excluding or freeing other irrelevant areas on the glove 100 from carrying more textured pattern 180 than necessary. More particularly, in several embodiments, e.g., as indicated in FIGS. 1-2 and 5, the index finger region 220 has its lateral side adjacent to the middle finger region 230 free of the textured pattern 180 such that the movement between the index finger and the middle finger will be unrestrained when the user wears the glove 100; but the lateral side of the index finger region 220 proximate to the thumb region 210 bears the textured pattern 180 for improving the gripping force with the thumb region 210, and the thumb region 210 also includes the textured pattern 180 around portions thereof.

Notwithstanding, in certain embodiments, one or more portions of the index finger region along the index finger's length, e.g., below the tip of the index finger region, are completely encircled by one or more textured patterns. In specific embodiments, the index finger region carries along at least a portion of its length, e.g., below a tip portion or tip thereof, on one of its lateral sides that faces an adjacent individual digit region, e.g., the lateral exterior side that faces or which is directly adjacent to the lateral exterior side of the middle finger region, at least one different textured pattern than that carried by one or more other exterior portions, e.g., an opposite or opposing lateral side, of the index finger region, e.g., below the tip portion or tip thereof.

Figure 3:
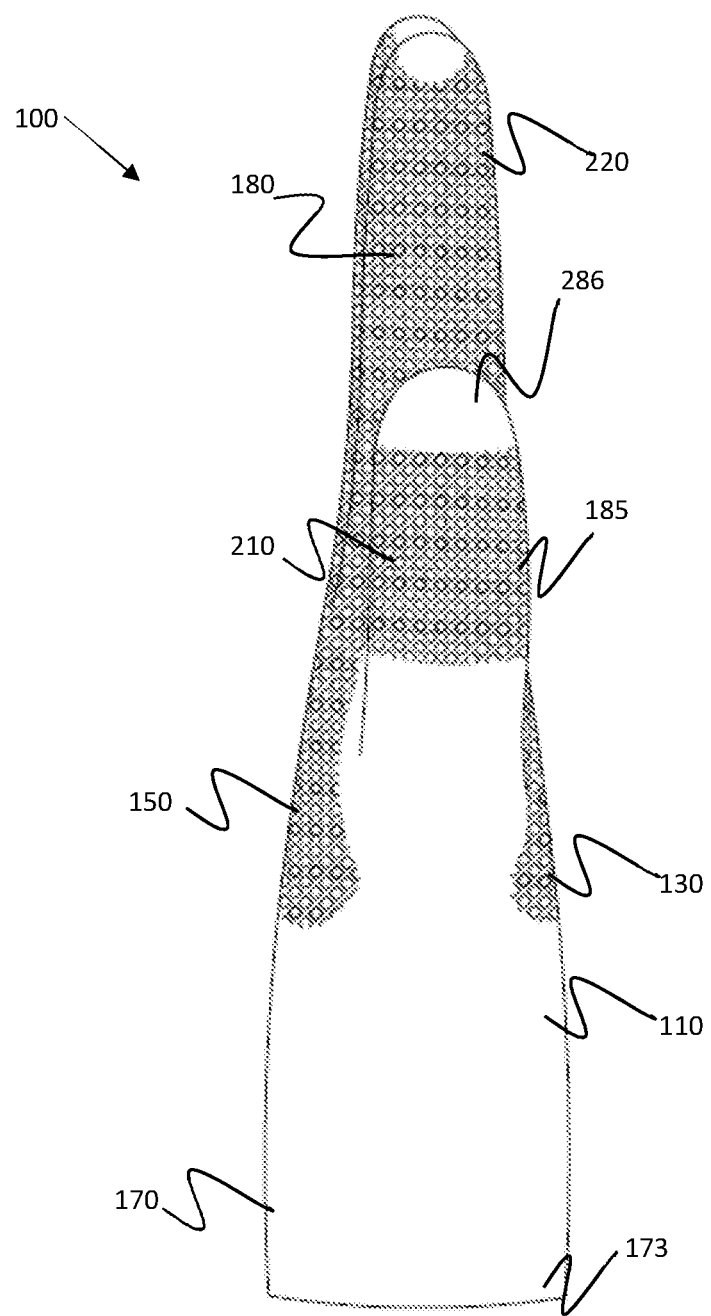
FIG. 3 illustrates a side view of the ambidextrous glove of FIG. 1.
Figure 4:
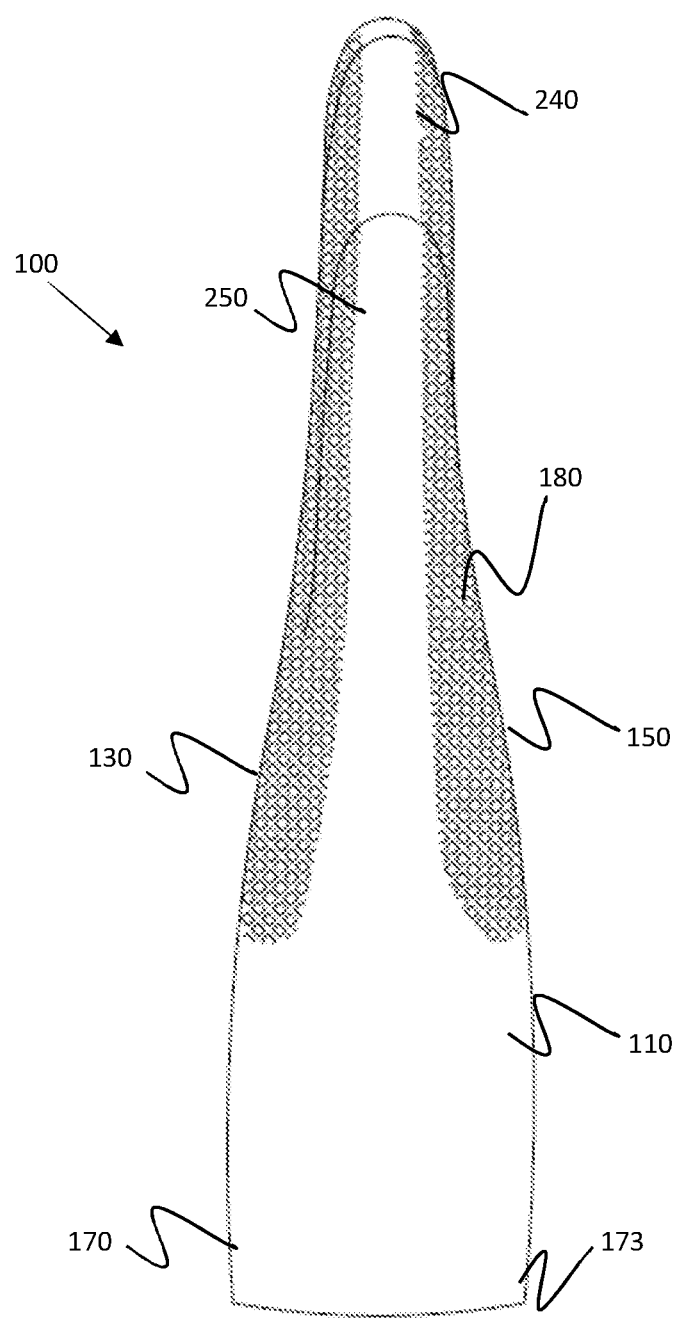
FIG. 4 illustrates a side view of the ambidextrous glove of FIG. 1.

In multiple embodiments, the textured pattern 180 on the thumb region 210 is preferentially disposed at a favorable thumb region portion, area, or location instead of the entire thumb region 210. More specifically, in such embodiments the thumb region 210 has its exterior surface fabricated with the textured pattern 180 around an area corresponding to the joint of the distal phalanges and the proximal phalanges of the thumb of the user, thus forming an enhanced gripping section 185 thereat. The enhanced gripping section 185 stretches towards the tip of the thumb region 210 covering an area corresponding to substantially 1/2 to 2/3 of the distal phalanges and 1/2 to 2/3 of the proximal phalanges in length of the thumb as seen in FIGS. 1-3. The enhanced gripping section 185 of the glove 100 is typically overlaid on the most outwardly curved portion or contour of the user's thumb upon user donning of the glove 100, as this thumb region is frequently employed to exert the required force for holding or maneuvering an object together with the user's index finger. As such, the index finger region 220 and thumb region 210 each provide a textured pattern 180 around at least substantial portions of their circumferences, e.g., a 360-degree circumferential textured pattern 180, to enhance gripping power. In certain embodiments, the enhanced gripping section 185 does not extend to the textured pattern 180 carried by the hand region 110. That is, the enhanced gripping section 185 does not extend proximally all the way to the hand region 110. Also, the lateral sides or edges of the hand region 110 can be free from having the textured pattern 180 in several embodiments, e.g., as depicted in FIGS. 1-2 and 5. Additionally, referring to FIGS. 5 and 7, the area around the tip 286 of the thumb region 210 and the four individual digit regions 260 can omit or exclude the textured pattern 180 in a number of embodiments. Moreover, the hand region 110 typically has an area 117 proximate to the cuff region 170 that omits or excludes the textured pattern 180.

The flock lining 280 carried by the interior surface of the glove 100 interfaces with the user's hand, and provides a smooth flocklined surface for the hand.

In several embodiments, a hand glove or glove 100 in accordance with the present disclosure provides enhanced flexibility for donning. Particularly, the glove 100 includes a hand region 110 including a palm portion 130 and a dorsal portion; a thumb region 210 and four individual digit regions 260 projecting away from one end of the hand region 110, where one of the four individual digit regions 260 next to the thumb region 210 is an index finger region 220; and a cuff region 170 extending outwardly from another end of the hand region 110 opposing to the thumb region 210 and the four individual digit regions 260 Like some of the embodiment described earlier, the cuff region 170 terminates into a terminal end 173 at which an opening 175 is defined for insertion of a user hand therein to don the glove 100. Preferably, the hand region 110, the thumb region 210 and the four individual digit regions 260 carries flock lining 280 on the interior surface of the hand glove 100, e.g., in a manner described above.

The cuff region 170 is integrated or impregnated with an anti-block coating, donning coating or acrylic coating. Lining the interior surface of the hand region, the thumb region 210 and the four individual digit regions 260 with flock promotes absorption of sweat generated and accumulated in the glove 100 after the user has been putting on the glove 100 for prolong period. The flock lining 280 significantly reduces discomfort associated to hand perspiration after donning of glove for extended period found in conventional glove. Furthermore, the anti-block coating, donning coating or acrylic coating deployed at the cuff region 170 lessens the friction generated against the insertion of the hand therein.

The glove 100 of can include a set of textured patterns 180 fabricated on the exterior surface of the hand region 110 and the four individual digit regions 26, with the lateral sides of the individual digit regions 260 other than the index finger region 220 free of the textured pattern 180. Yet, the index finger region 220 has one of the lateral sides adjacent to the middle finger region 230 free of textured pattern 180 to prevent excessive friction produced thereby hampering the fingers movement. Also, the thumb region 210 has the exterior surface fabricated with the textured pattern 180 around an area corresponding to the joint of the distal phalanges and the proximal phalanges of the thumb of the user, forming an enhanced gripping section 185 thereto in several embodiments of the hand glove 100. The enhanced gripping section 185 extends towards the tip of the thumb region 210 covering an area corresponding to substantially 1/2 to 2/3 of the distal phalanges, e.g., 1/2 to 2/3 of each the distal phalanges and the proximal phalanges, of the thumb of the user once the glove 100 is worn.

A process 300 of producing a hand glove 100 in accordance with an embodiment of the present disclosure is described as follows. The process essentially includes forming 335 a set of coated areas (i.e., one or more coated areas) by applying a coating to a first coagulated latex layer shaped on a former; forming 345 a second latex layer on the first coagulated latex layer, involving dipping the former into the second latex layer; creating 350 flock lining 280 on one or more areas on the surface of the formed second latex layer to produce molded glove 100, the created flock lining 280 free from overlaying or separate from the coated area(s); drying 355 and leaching 360 the molded glove; and stripping the molded glove off the former to obtain the glove 100. The glove 100 produced is defined or generally defined by a hand region 110, a thumb region 210 and four individual digit regions 260 distally projecting away from one end of the hand region 110, and a cuff region 170 proximally extending away from another end of the hand region 110 opposite to the thumb region 210 and the four individual digit regions 260, with a terminal end 173 of the cuff region 170 providing an opening 175 for insertion of a user's hand therein.

Figure 9:
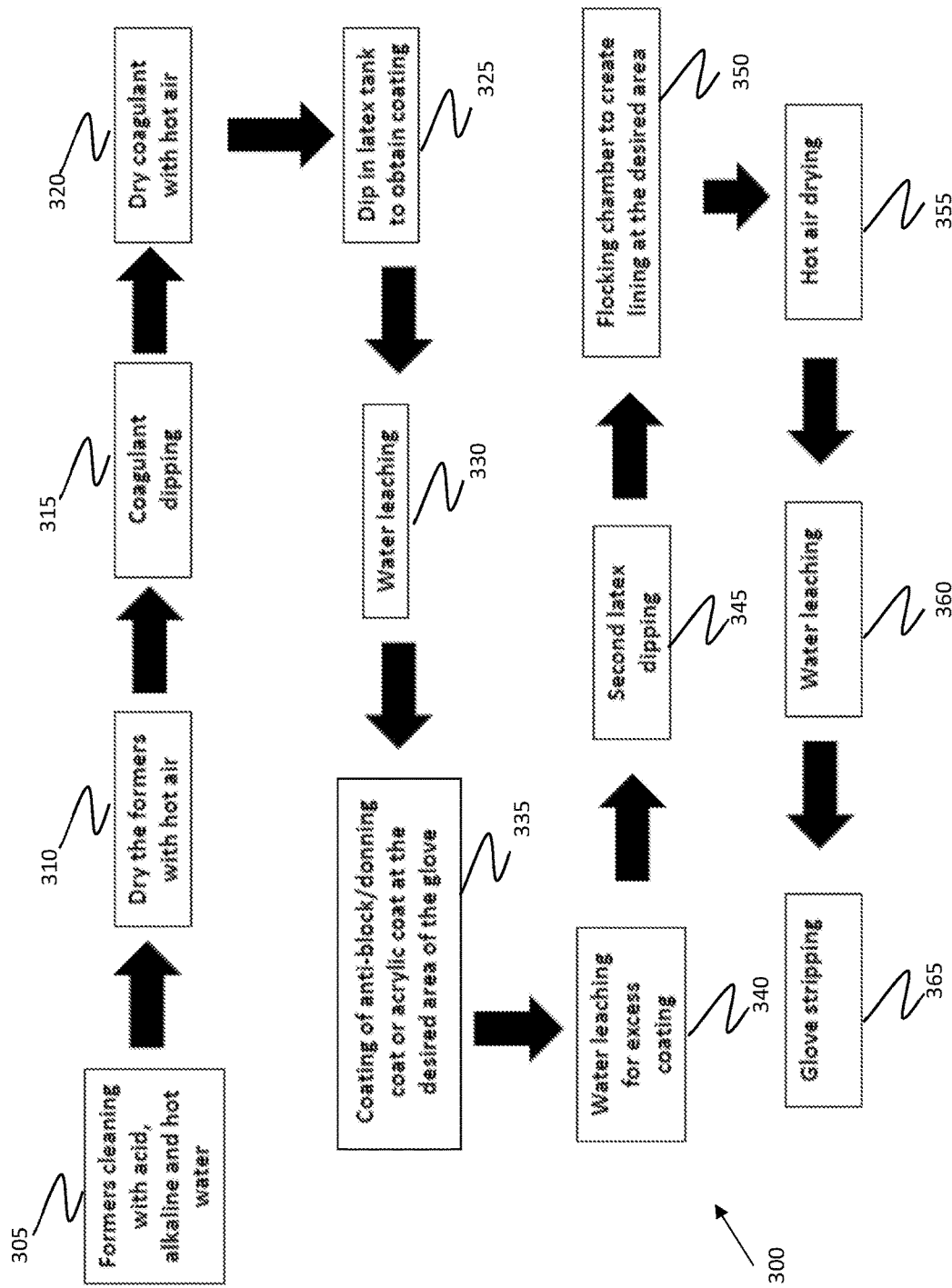
FIG. 9 is a flowchart showing a manufacturing process for producing a hand glove in accordance with an embodiment of the present disclosure.

A more detailed illustration of a manufacturing process 300 in accordance with the present disclosure is shown in the flowchart of FIG. 9, where particular alternative or optional steps can be included in various embodiments. For instance, the former or mold of the glove 100 can be cleaned 305 prior to subjecting to any dipping or coating in the production process 300. The cleaning 305 ensures no residue from a previously produced batch of gloves remains on the former. Such residue or dirt can cause defects, e.g., holes and/or deformation in the produced glove 100. The cleaning 305 can include washing the formers in a combination of acidic bath (chlorinated water), clean hot water and/or alkaline bath. The alkaline bath is typically performed after the acidic bath to rid the acids off the surface of the formers. Physical scrubbing of the former by way of a plurality of rotating brushes may be part of the cleaning in some embodiments. The cleaned formers will be dried 310 under reduced air pressure and/or hot air.

Before forming the coating, the process can apply coagulant 315 on the former by way of dipping or immersing the former into a coagulant bath. The coagulant bath or solution can contain, but is not limited to, a nitrate solution such as a calcium nitrate solution. Nitrates in the solution act as a coagulant helping adherence of the latex, natural or synthetic, on the former during glove fabrication. Optionally, the coagulant solution may include calcium carbonate as well, which assists later removal or disassociation of a fabricated glove 100 from the former. The coagulant solution applied on the former can undergo drying step 320 using reduced air pressure and/or hot air. The former with dried coagulant can then proceed to latex dipping 325 in a latex tank in which a first compounded latex solution is filled. The coagulant on the former reacts with the latex that come into contact therewith, and creates the first coagulated latex layer on the former travelling through the compounded latex. The thickness of the first coagulated latex layer established on the former will be positively correlated with the amount of coagulant and the duration of the latex dipping. The first compounded latex solution can be an elastic polymer including any one or a combination of natural latex, nitrile latex, styrene-butadiene, isoprene, chloroprene, isobutylene, and neoprene. More specifically, the first latex solution can be a mixture of monomer mainly selected from the group of natural latex, nitrile latex, styrene-butadiene, isoprene, chloroprene, isobutylene, and neoprene. The first compounded latex solution can be optionally blended with an additive, e.g., in addition to the monomer(s) used.

A water or chemical leaching portion 330 typically follows the latex dipping to remove chemical residues and protein retained on the surface of the first coagulated latex layer. Typically, a hot water bath is employed in embodiments that include water leaching to better dissolve proteins that mainly contribute to skin allergic reaction among the users. In general, the longer the leaching duration, the better the protein removal. Once the water leaching 330 has been completed, the process 300 progresses to forming 335 on one or more coated areas with coating on the first coagulated latex layer shaped on the former. The coating can be any one or a combination of an anti-block coating, a donning coating, or an acrylic coating capable of aiding insertion of the user's hand into the glove 100 with relatively lower friction between the hand and portions of the glove 100 that carry such coating. The coating is created on portions or areas of the glove that exclude or are free from being overlaid with flock lining 280. The coating is typically disposed on selected areas on the cuff region 170. In some embodiments, the coating is applied on the entire cuff region 170 of the first coagulated latex layer. The coating can be developed on the first coagulated latex layer through beading, where the former twirls and contacts the region of the glove 100 to be coated with the desired coating. Alternatively, the process 300 can rely on spray coating to apply or provide the coating on the selected region(s) or area(s) of the first coagulated latex layer. In various embodiments, the coated area is located at the cuff region 170 of the hand glove, and facilitates insertion of the user's hand therein. Upon finishing the coating forming 335, the former together with the coated first coagulated latex layer may be subjected to another round of water leaching 340 to remove excessive coating and proteins, followed optionally by drying. The process 300 subsequently further dips 345 the coated and leached first coagulated latex layer into a second latex solution forming a second latex layer on the first latex layer, giving rise to an elastomeric glove 100 on the former. The process 300 can include an additional portion in certain embodiments, after the second latex dipping 345, first and/or second dipping, to cross-link the latex with an accelerator agent by way of a vulcanization process to boost the glove elasticity and tensile strength for better service life.

After formation of the elastomeric glove, the former can optionally go through another round of drying and leaching before being processed 350 in a flocking chamber for creating flock lining 280 on selected or predetermined areas on the interior surface of the elastomeric glove.

The flock lining 280 can be produced using essentially any conventional technique, such as but not limited to pneumatic blowing or electrostatic flocking techniques, or a combination thereof. The flock lining 280 is free from overlaying onto the area of the glove where the coatings were previously provided. In several embodiments, the process 300 creates the flock lining 280 on the interior surface of the elastomeric glove other than the cuff region 170, which is impregnated or embedded with the coating. The flock-lined elastomeric glove 100 can undergo further drying 355 and water leaching 360 to clean off the surface carrying the flock lining 280, and can then be removed or stripped off 365 of the former to acquire the hand glove 100.

Although particular non-limiting representative embodiments in accordance with the present disclosure have been described and shown, it will be understood that modifications in details of construction can be provided, which remain within the scope of the present disclosure, which is limited only by the following claims defining the invention.

The invention claimed is:

1. A hand glove formed of an elastic polymer, the hand glove comprising:
a hand region including a palm portion and a dorsal portion opposite to the palm portion;
a thumb region and four individual digit regions distally projecting away from one end of the hand region, wherein an individual digit region directly adjacent to the thumb region is an index finger region;
a cuff region proximally extending away from another end of the hand region that is opposite to the thumb region and the four individual digit regions, the cuff region having a terminal end defining an opening for insertion of a user's hand therein; and
a textured pattern fabricated on an exterior surface of the hand region and each of the four individual digit regions, with lateral sides of each individual digit region other than the index finger region free of the textured pattern,
wherein the hand region comprises flock lining on one or more selected areas of the interior surface of the palm portion,
wherein the cuff region is free from flock lining, and
wherein the glove is ambidextrous.

2. The hand glove of claim 1, wherein portions of the cuff region carry an anti-block coating, a donning coating, or an acrylic coating, and/or wherein portions of the cuff region are chlorinated.

3. The hand glove of claim 1, further comprising flock lining on the interior surface of at least 70% of the hand region, or the entire hand region.

4. The hand glove of claim 3, further comprising flock lining on the interior surface of the thumb region and the interior surface of each of the four individual digit regions.

5. The hand glove of claim 1, wherein the index finger region (a) has one of its lateral sides that faces an adjacent individual digit region free of the textured pattern, (b) is completely encircled around its periphery along at least a portion of its length below a tip portion of the index finger region by the textured pattern, or (c) carries on one of its lateral sides that faces an adjacent individual digit region at least one different textured pattern than other exterior portions of the index finger region below the tip portion thereof.

6. The hand glove of claim 1, wherein the thumb region has its exterior surface fabricated with the textured pattern around an area corresponding to a joint of the distal phalanges and the proximal phalanges of the thumb of the user to form an enhanced gripping section on the exterior surface of the thumb region, the enhanced gripping section stretching towards the tip of the thumb region covering an area corresponding to substantially $1;2$ to $2/3$ of the distal phalanges of the thumb of the user.

7. The hand glove of claim 6, wherein the enhanced gripping section is free from merging or joining with the textured pattern fabricated on the hand region.

8. The hand glove of claim 1, wherein the elastic polymer comprises any one or a combination of natural latex, nitrile latex, styrene-butadiene, isoprene, chloroprene, isobutylene, and neoprene.

9. A hand glove formed of an elastic polymer, the hand glove comprising:
a hand region including a palm portion and a dorsal portion opposite to the palm portion;
a thumb region and four individual digit regions distally projecting away from one end of the hand region, wherein an individual digit region directly adjacent to the thumb region is an index finger region;

a cuff region extending proximally away from another end of the hand region that opposes the thumb region and the four individual digit regions, the cuff region having a terminal end defining an opening for insertion of a user hand therein; and a textured pattern fabricated on an exterior surface of the hand region and the four individual digit regions, with lateral sides of the individual digit region other than the index finger region free of the textured pattern, wherein the index finger region has one of its lateral sides adjacent to the individual digit region free of the textured pattern, wherein the hand region, the thumb region and the four individual digit region comprise flock lining on the interior surfaces thereof, wherein the cuff region carries an anti-block coating, a donning coating or an acrylic coating, and/or the cuff region is chlorinated, and wherein the glove is ambidextrous.

10. The hand glove of claim 9, wherein the thumb region has its exterior surface fabricated with the textured pattern around an area corresponding to a joint of the distal phalanges and the proximal phalanges of the thumb of the user forming an enhanced gripping section thereto, the enhanced gripping section stretches towards the tip of the thumb region covering an area corresponding to substantially ½ to ⅔ of the distal phalanges of the thumb of the user.

\* \* \* \* \*